Oct. 5, 1954 J. S. CLARKE 2,690,962
VESSEL FOR CONTACTING GASEOUS FLUIDS AND SOLIDS
Filed Oct. 6, 1952 2 Sheets-Sheet 2

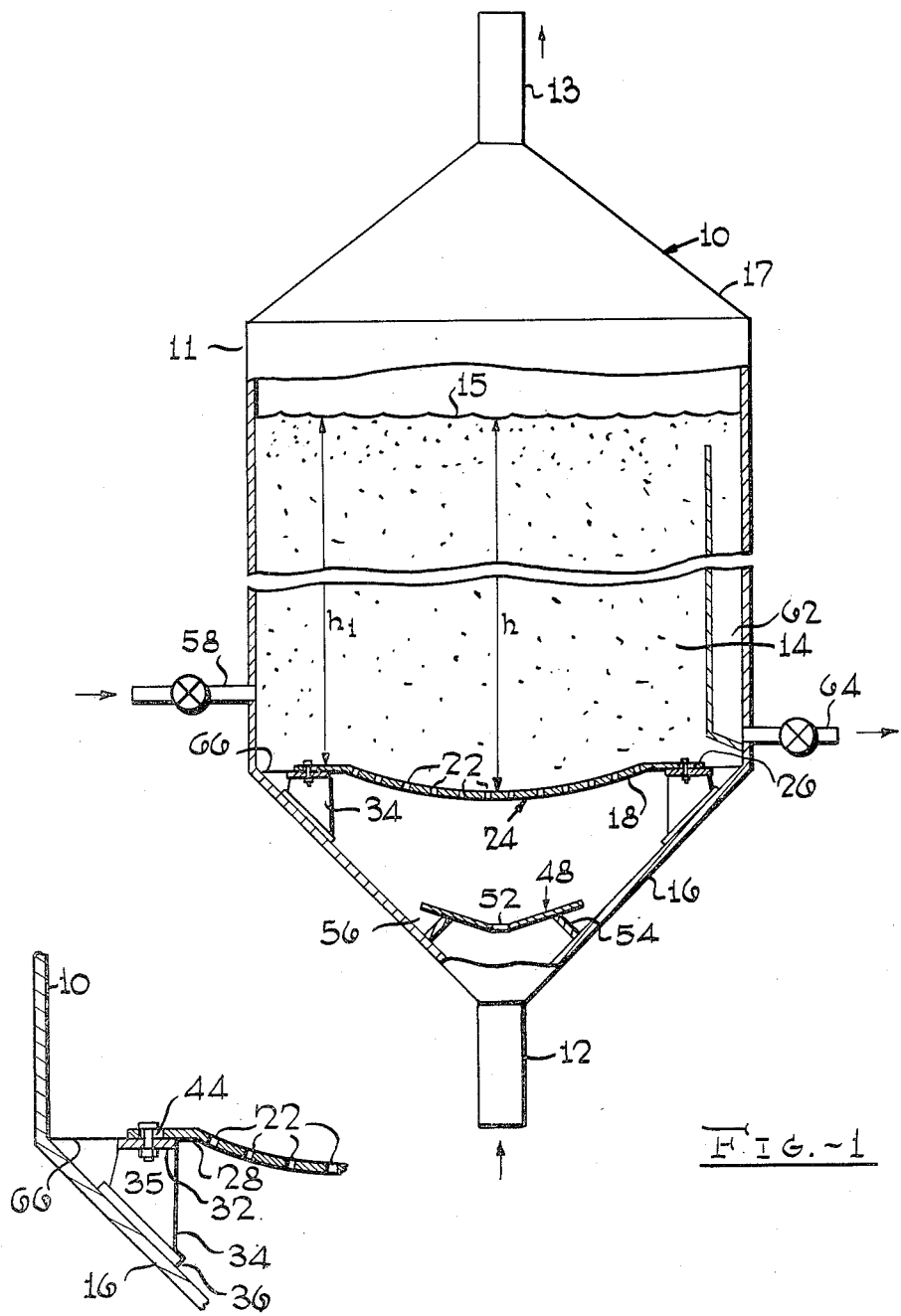

James S. Clarke Inventor
By George J. Silbury Attorney

UNITED STATES PATENT OFFICE 2,690,962

VESSEL FOR CONTACTING GASEOUS FLUIDS AND SOLIDS

James S. Clarke, Cranford, N. J., assignor to Standard Oil Development Company, a corporation of Delaware Application October 6, 1952, Serial No. 313,319

5 Claims. (Cl. 23—288)

This invention relates to an apparatus for contacting finely divided solids with gaseous fluids and more particularly relates to a vessel provided with a new type of grid or distributing member for evenly distributing solids and/or gaseous fluids across the area of the vessel.

In fluidized solids systems such as catalytic cracking units where fluidized catalyst particles are used the gaseous fluid such as hydrocarbon vapors and catalyst pass as a relatively dilute suspension through a line into the bottom of the reactor below a distributing grid member which heretofore has been a flat circular perforated plate supported at its periphery and also at points intermediate between the center and the periphery. In certain types of construction the gas or vapor is admitted to the vessel at a point directly below the center of the grid member. With this type of construction the gas or vapor flows through the grid and there is concentration of the upflowing gas or vapor at the center of the grid member. As more gas or vapor flows up through the center of the grid member, the density of the fluidized bed of solids above the grid member is less than the portions of the fluidized bed adjacent the walls of the vessel and because of less resistance more gas or vapors flow through the less dense central portion of the fluidized bed and poor contacting between the catalyst and vapors or gases is obtained.

While some improvement is obtained with a deflecting member below the grid, the problem of more gas or vapor passing upwardly through the center of the fluidized bed than in the annulus adjacent the vessel wall is not overcome.

The same problem is present in regenerator vessels for fluidized catalysts using a grid member. The present invention is not to be restricted to catalytic cracking operations because it is applicable to all processes where even distribution of a gas or vapor is desired to a fluidized bed of solids.

According to the present invention in the contacting of fluidized solids with gas or vapor in a confined chamber wherein the gas or vapor flow is upwardly a new type of grid member is provided at the bottom of the fluidized solids bed to promote even distribution of the rising gas or vapor throughout the bed. The new type of grid is equivalent to or approximates a portion of a sphere disposed in the contacting vessel concave upward. The grid is dished out and in position has the appearance of a dish with the concave face being arranged on the upper side similar to a dish resting in its normal position on a surface. The new concave spherical grid is supported in position entirely from the periphery thereof without the need of intermediate supports. The concave spherical grid has a further operating advantage from the standpoint of distribution in that the depth of the fluidized solids bed is greater at the center which tends to reduce vapor or gas flow through the center of the solids bed and thus counteracts the usual tendency for the flow of gas or vapor to be greater at the center of the fluidized solids bed. More of the gas or vapor will be directed to portions of the fluidized solids bed than the center and better contacting of solids and gas or vapor will be obtained. The new grid can be used in any process employing a confined or circulating bed of fluidized solids in which gas is to be passed up through the bed of solids.

The degree of curvature of the spherical grid may be varied to give optimum balance between the central inlet effects of gas or vapor and suppression of central flow of gas or vapor by added depth of fluidized solids bed at the center.

In the drawing:

Fig. 1 represents a partial vertical section of a vessel with the grid in position and with parts broken away to facilitate the disclosure;

Fig. 2 represents a detail showing the peripheral support for the grid; and

Figure 3:
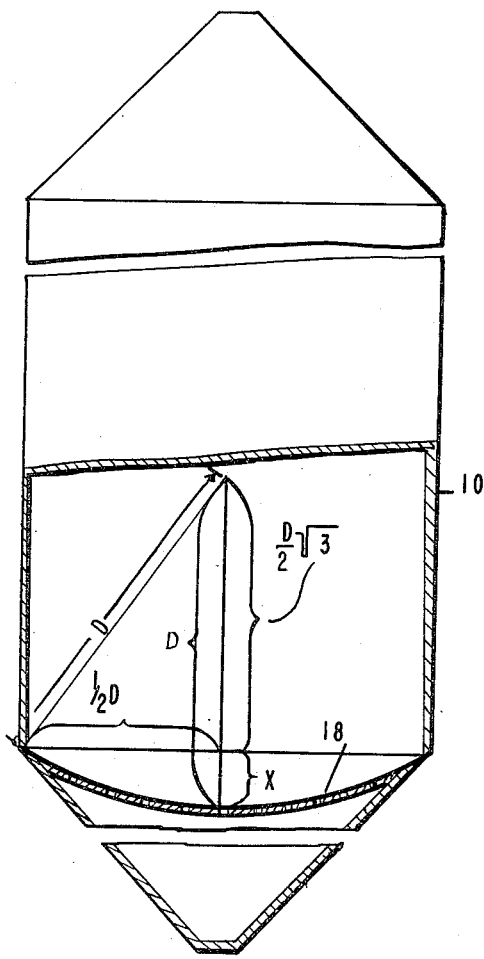
Fig. 3 represents a diagrammatic view of part of the vessel showing the relationship between the diameter of the vessel, the radius of curvature of the grid and the amount of dishing of the grid.

Referring now to the drawing the reference character 10 designates a vertical cylindrical vessel which may be a reactor or regenerator in a catalytic cracking system or may be a vessel useful for contacting gas or vapor with fluidized solids for any desired reaction where the gas or vapor passes upwardly through the vessel 10. Vessel 10 is provided with a large central cylindrical portion 11, a bottom inlet 12 for gaseous fluid and a top outlet 13 for removing reaction vapors or gases or gaseous fluid after contact with the fluidized bed 14 of solids diagrammatically shown by dots in the drawing and having a level indicated at 15. Bottom inlet 12 is connected to the bottom of the central large cylindrical portion 11 by an inverted frusto-conical portion 16. Top outlet 13 is connected with the top of the central large cylindrical portion 11 by a frusto-conical portion 17. Alternately, members 16 and 17 may be hemispherical, elliptical, etc. depending upon constructional preferences in any particular application. Conical member 16 forms a bottom conical closure associated with opening 12.

The gaseous fluid passing upwardly through vessel 10 has a superficial velocity of between about 1.0 and 5.0 feet per second in a cracking or regeneration operation where the catalyst is commercial silica-alumina of about 100 to 400 mesh or finer with the greatest proportion of the particles being between about 0 and 150 microns to produce a dense fluidized turbulent liquid simulating mixture or bed.

The distributing perforated grid of the present invention is shown at 18 as a circular or round dished or concave grid provided with a multiplicity of openings 22 to permit passage of gas or vapor therethrough. The grid 18 is arranged concave upward so that its central portion 24 is lower in vessel 10 than its periphery 26. Preferably the grid is a segment of a sphere. Grid 18 may be made of one piece in small installations or as two or more parts in larger installations. Irrespective of whether the grid is made of one piece or two or more parts it is only necessary to support the spherical segment grid at its periphery 26. Using large conventional flat grids it was necessary to support the flat grids at the periphery and also at other points between the center and the periphery. The intermediate support members are objectionable as they represent considerable expense to provide and install, they are subject to erosion and high maintenance and when in position have an adverse effect on distribution.

As shown in Fig. 2 grid 18 at its periphery has a flat annular portion 28 which rests on horizontal flat portion 32 of support assembly 34. A plurality of assemblies 34 is provided around the vessel. Each support assembly 34 has a vertical wall 35 and an angular base portion 36 which is suitably secured, as by welding, to the inner wall of the inverted frusto-conical bottom portion 16 of vessel 10. The grid 18 is secured to the supports 34 by bolts or the like 42 each of which extends through an elongated slot 44 in the flat annular portion 28 of grid 18 and an opening in flat horizontal portion 32 of supports 34. Since the inner walls of the vessel may be insulated and thus will be at a lower operating temperature than the grid, the elongated slots 44 permit expansion of the grid when it is heated to the temperatures to be used in the reaction. In catalytic cracking the temperature in the reactor may be about 850–1000° F. and in the regenerator may be about 900°–1200° F. In regenerating catalyst, air or air plus spent catalyst is passed upwardly through inlet line 12. In the cracking phase of the process, vaporized hydrocarbon plus regenerated catalyst is passed upwardly through inlet line 12.

Instead of supporting the support assembly units on the inner wall of bottom portion 16, support assemblies of different shape, as for example blocks, may be secured in spaced relation in any suitable manner to the bottom portion of the internal wall of cylindrical portion 11 just above the junction of the cylindrical portion 11 and bottom portion 16.

When gas or vapor is passed upwardly through inlet 12, which is shown as arranged below the center of grid 18, it is preferred to provide a deflecting member 48 in the lower portion of vessel 10 below grid 18. One form of deflecting member 48 is shown in Fig. 1 as having an inverted frusto-conical shape. Member 48 has an opening 52 in the bottom thereof to permit return to the gas stream of solid particles collecting on top of the deflector member 48. Member 48 is generally parallel to grid 18 but the conical wall of deflector 48 is relatively flat and would, if extended, intersect the wall of the bottom section 16 of vessel 10. The deflector member 48 is spaced from the bottom wall 16 of vessel 10 and above inlet 12 by a plurality of spacer or support members 54 which comprise arms or supports suitably secured to wall 16 and deflector member 48.

As the gas or vapor passes up through inlet line 12 it strikes deflector member 48 and passes through the annular passageway 56 formed by the outer end of the conical shaped deflector member 48 and the bottom wall 16 of vessel 10.

In cases where a confined bed of catalyst particles or contact particles is maintained in a vessel, it may be necessary only at certain intervals to add make-up catalyst or to replenish used catalyst. In cases where catalyst or contact particles are to be regenerated or heated in a separate vessel and then returned to the reactor, it is necessary in a continuous process to remove the particles continuously and to supply regenerated or heated particles to the fluidized bed. Vessel 10 in Fig. 1 is shown as provided with an inlet 58 for the introduction of fresh or regenerated or heated catalyst or contact particles to the fluidized bed on grid 18. Where catalyst or contact particles are fed into vessel 10 with the gas or vapor passing through inlet 12, inlet 58 may be used for adding make-up catalyst. Vessel 10 is also provided with a withdrawal well 62 extending into the dense fluidized bed but preferably below the level 16 thereof for withdrawing solids particles from the fluidized turbulent bed for regeneration and/or reheating via line 64.

An annular seal plate 66 is provided beyond the periphery 26 of grid 18 to function as a grid seal to prevent by-passing of gas around the grid.

If the deflector member 48 were omitted it can be seen that with a conventional flat perforated grid plate, most of the gas or vapor from line 12 would pass up through the center of the grid because of the velocity and direction of flow of the gas or vapor. Also the density of the solids mixture above the center of the grid would be less than in the outer portions of the fluidized bed and this would exaggerate flow of gas or vapor through the center of the solids fluid bed. Some improvement can be obtained by using the deflector member with the conventional flat grid. The deflection of the inlet gases necessary to approach even distribution, however, results in excessive erosion of the deflector and the walls of the bottom section 16 of the vessel.

In the present invention when using a dished or round spherical segment grid 18, depth of the bed as shown by "$h$" at the center is greater than it is at the outer portion at "$h_1$." The added depth at the center tends to suppress flow through the center and as a result, with the inlet gases entering the vessel below the center, the problem of obtaining even distribution of gas flow through the bed is not as difficult as with a flat grid under the same flow conditions. Less severe diversion of the inlet stream is required to obtain even distribution. As a result, the inlet deflector may be of smaller dimensions and erosion of the deflector, of its supporting members, and of the vessel walls under the deflector is reduced greatly below that which would occur with a flat plate grid with deflector.

In a catalytic cracking unit where the typical average regenerator is about 23 feet in internal diameter, the spherical portion of grid 18 is on a 23 foot radius for this particular design but other curvatures may be used. For this design the grid 18 has about 1400 one inch holes 22 and the grid is about 5/8 inch thick and 16 peripheral support assemblies 24 are used. The inlet 12 is about 34 inches in diameter. For this design the bottom of concave or dished grid 18 is about 2.4 feet below the flat annular peripheral portion 26 of the grid or the difference between "$h$" and "$h_1$" is about 2.4 feet, so that there is an appreciable difference in the depth of the center of the bed of fluidized solids and the depth of the bed at the outer periphery of the bed. A representative bed height for a fluidized catalyst vessel of these dimensions would be about 15 feet.

Fig. 3 shows the curvature or the amount of dishing of the concave dished grid 22 in vessel 10. The dished grid forms a portion of a sphere and as given in the specific example, the radius of the sphere from which the grid is formed is substantially the same as the diameter of the vessel. In Fig. 3, D represents the diameter of the vessel and the radius of curvature of the grid. The right angle triangle formed in Fig. 3 shows the hyptoenuse as D, the horizontal side as $$\frac{D}{2}$$

and the vertical side as $$\frac{D}{2}\sqrt{3}$$

Hence the distance from the bottom of the grid to the plane of the periphery, designated X equals $$D - \frac{D}{2}\sqrt{3}$$

and this in turn equals $$D\,1 - \frac{\sqrt{3}}{2}$$

which in turn equals $$D\left(\frac{2-\sqrt{3}}{2}\right)$$

What is claimed is:

1. An apparatus including a vertically disposed vessel having a cylindrical body portion and a bottom closure plate provided with a central inlet for gaseous fluids, a top outlet for gaseous fluid from said vessel, a circular dished distribution grid supported in the lower portion of said vessel, said grid being arranged in said vessel so that the central portion of the grid is below the plane of the periphery of said grid a distance of the order of $$D\left(\frac{2-\sqrt{3}}{2}\right)$$

where D is substantially equal to the radius of curvature of said grid and also substantially equal to the diameter of said vessel.

2. An apparatus according to claim 1 wherein a gas deflector member is arranged below said grid and above the inlet in said bottom closure plate.

3. An apparatus according to claim 1 wherein said grid is supported only at its periphery, spaced supporting means are secured to said bottom closure plate adjacent the periphery of said grid and means are included for securing the periphery of said grid to said supporting means.

4. An apparatus including a vertically arranged vessel having a cylindrical center portion and a bottom inverted frusto-conical portion extending down from the bottom of said cylindrical portion and a top frusto-conical portion extending upward from the upper portion of said cylindrical portion, a gas inlet line communicating with the small lower end of said inverted conical portion, a gas outlet line communicating with the small upper end of said upper conical portion, a circular dished grid formed from a section of a sphere and arranged adjacent the lower portion of said cylindrical central portion of said vessel, said grid being arranged concave upward so that the central portion of the grid in said vessel is below the plane of the periphery of said grid a distance of the order of $$D\left(\frac{2-\sqrt{3}}{2}\right)$$

where D is substantially equal to the radius of curvature of said grid and also substantially equal to the diameter of said vessel.

5. An apparatus including a vertical disposed vessel having a cylindrical body portion and a bottom closure plate provided with an inlet for gaseous fluids, a top outlet for gaseous fluid from said vessel, a circular concave gas distribution grid formed from a section of a sphere and supported at its periphery at the upper portion of said bottom closure plate, said grid being arranged in said vessel so that the central portion of the grid is below the plane of the periphery of said grid a distance of the order of $$D\left(\frac{2-\sqrt{3}}{2}\right)$$

where D is substantially equal to the radius of curvature of said grid and also substantially equal to the diameter of said vessel whereby a bed of fluidized solids on said grid in said vessel will have a greater depth of solids at the center of said grid and a better distribution of gaseous fluid introduced via said inlet will be obtained in portions of the fluidized bed other than the center portion thereof.

References Cited in the file of this patent

UNITED STATES PATENTS

| Number | Name | Date |
|---|---|---|
| 2,443,190 | Krebs | June 15, 1948 |
| 2,470,395 | Gohr et al. | May 17, 1949 |